United States Patent [19]

Tsujimura et al.

[11] Patent Number: 4,966,500
[45] Date of Patent: Oct. 30, 1990

[54] FACE MILLING CUTTER WITH CUTTER INSERTS

[75] Inventors: Osamu Tsujimura, Kawasaki; Tatsuo Arai, Kitamoto; Takayoshi Saito, Shinagawa, all of Japan

[73] Assignee: Mitsubishi Kinzoku Kabushiki Kaisha, Tokyo, Japan

[21] Appl. No.: 245,149

[22] Filed: Sep. 16, 1988

[30] Foreign Application Priority Data

| Sep. 16, 1987 | [JP] | Japan | 62-231712 |
| Sep. 30, 1987 | [JP] | Japan | 62-149571[U] |
| Feb. 17, 1988 | [JP] | Japan | 63-19824[U] |
| Mar. 3, 1988 | [JP] | Japan | 63-28392[U] |
| Mar. 3, 1988 | [JP] | Japan | 63-28394[U] |
| Mar. 3, 1988 | [JP] | Japan | 63-28395[U] |
| Mar. 3, 1988 | [JP] | Japan | 63-28393[U] |

[51] Int. Cl.$^5$ .............................................. B23C 5/20
[52] U.S. Cl. ........................................ 407/34; 407/41; 407/42; 407/53; 407/61; 407/113
[58] Field of Search ................ 407/34, 40, 41, 42, 407/53, 55, 56, 57, 58, 59, 60, 61, 63, 113, 114

[56] References Cited

U.S. PATENT DOCUMENTS

| 2,690,610 | 10/1954 | Begle et al. | 407/34 |
| 3,481,015 | 12/1969 | Bogner | 407/42 |
| 3,818,561 | 6/1974 | Montana | 407/61 |
| 4,194,860 | 3/1980 | Hopkins | 407/42 |
| 4,230,429 | 10/1980 | Eckle | 407/34 |
| 4,597,695 | 7/1986 | Johnson | 407/34 |
| 4,645,384 | 2/1987 | Shimomur | 407/42 |

FOREIGN PATENT DOCUMENTS

| 456904 | 10/1966 | Japan | 407/42 |
| 59-12520 | 1/1984 | Japan . | |
| 1399015 | 5/1988 | U.S.S.R. | 407/42 |

Primary Examiner—Frederick R. Schmidt
Assistant Examiner—Blynn Shideler
Attorney, Agent, or Firm—Cushman, Darby & Cushman

[57] ABSTRACT

In a face milling cutter, a plurality of cutter inserts are detachably mounted to an outer periphery of a forward end portion of a cutter body. The cutter inserts are arranged in peripherally spaced relation to each other about a rotary axis of the cutter body. Each of the cutter inserts has opposite faces one of which, first face being generally in the form of an octagon having eight ridgelines or a hexagon having six ridgelines, which are formed respectively into cutting edges. Each pair of adjacent cutting edges as a major edge are intersected with each other at an obtuse angle.

24 Claims, 12 Drawing Sheets

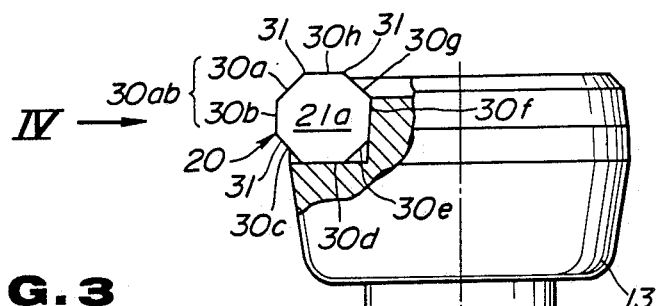
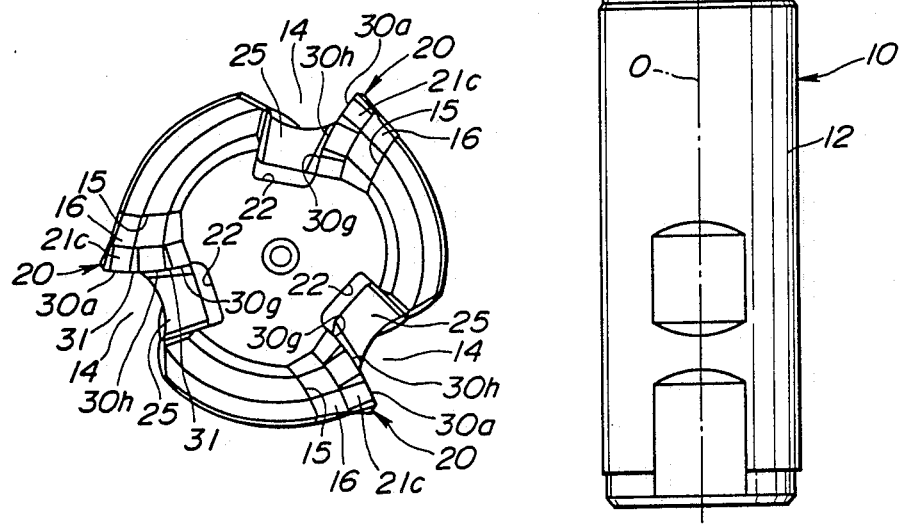
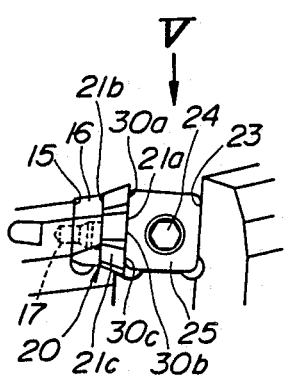
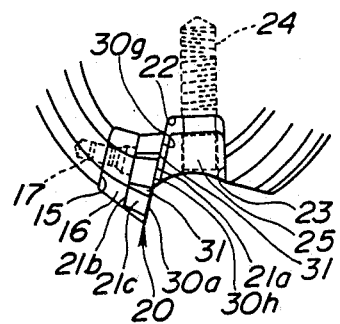

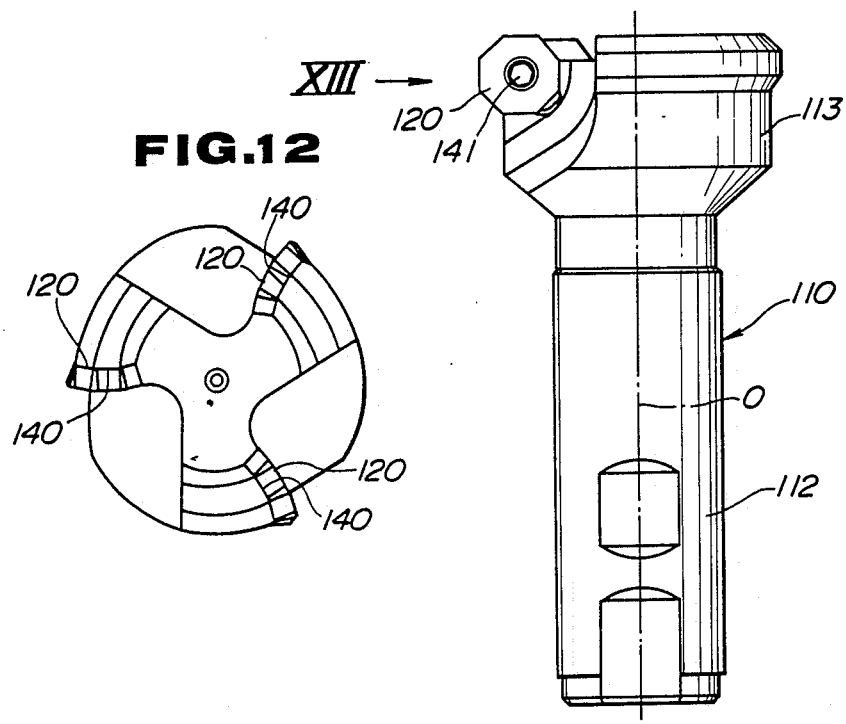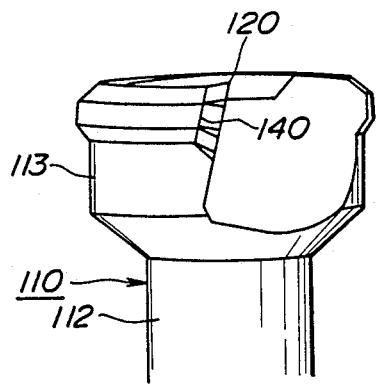

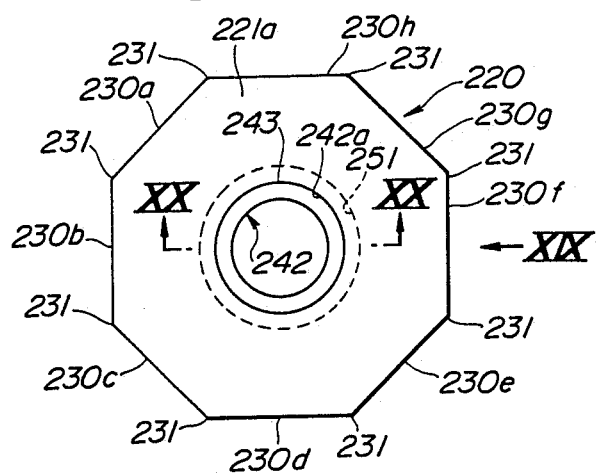
FIG.16
FIG.17
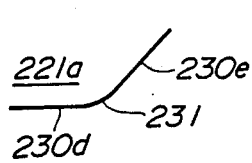
FIG.18
FIG.19
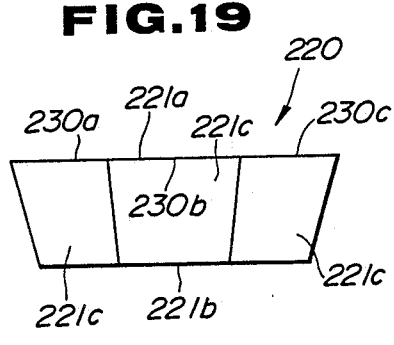
FIG.20
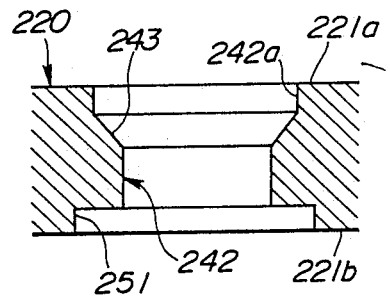

FACE MILLING CUTTER WITH CUTTER INSERTS

BACKGROUND OF THE INVENTION

1. Field of the invention

The present invention relates to a face milling cutter in which a plurality of cutter inserts are detachably mounted to an outer periphery of a forward end portion of a cutter body.

2. Prior art

A face milling cutter of the kind referred to above is known as shown, for example, in FIG. 1 of the accompanying drawings. The face milling cutter comprises a cutter body 1 which is adapted to be mounted to a main spindle of a milling machine or the like for rotation about a rotary axis O. The cutter body 1 is composed of a columnar shank 2 and a head 3 formed at a forward end portion of the shank 2. The head 3 is in the form of a disc having a relatively large thickness A plurality of cutter inserts 4 are detachably mounted to an outer periphery of a forward end portion of the head 3. Each of the cutter inserts 4 is in the form of a square plate.

The cutter insert 4 has four cutting edges 5a through 5d. A minor cutting edge 6 is formed between each pair of adjacent cutting edges. The cutting edge 5a serves as a major cutting edge which is inclined at 45° with respect to the rotary axis O of the cutter body 1 in such a manner that the major cutting edge 5a approaches the rotary axis O as the distance increases from a rearward proximal end of the cutter body 1. That is, the major cutting edge 5a has a corner angle of 45°.

By the way, it is the state of things that when surface cutting is carried out by the use of the above-described face milling cutter, only a part, on the order of one half to a third, of the entire length of the major cutting edge 5a can be utilized, because of various restrictions including the power of the employed machine such as a milling machine or the like, the hardness of a workpiece, distortion of the workpiece due to cutting heat, and the like. Accordingly, an unused section remains in the major cutting edge 5a of the used cutter insert 4 to be disposed of. This is extremely uneconomical.

Further, even if the above-mentioned restrictions are overcome, the cutting operation by the use of the entire length of the major cutting edge 5a results in such a problem that chipping tends to occur at the minor cutting edge 6, because each pair of adjacent cutting edges intersect at a 90° angle. In particular, such chipping also tends to occur at the minor cutting edge 6, when the cutter insert 4 is used to cut a recess in a workpiece.

SUMMARY OF THE INVENTION

It is an object of the invention to provide a face milling cutter employing a plurality of cutter inserts, in which it is possible to utilize the entire length of each of a plurality of cutting edges of each of the cutter inserts without occurrence of chipping of the cutting edge, whereby the cutter inserts can be used economically.

According to the invention, there is provided a face milling cutter comprising:

a cutter insert body having a rotary axis; and a plurality of cutter inserts detachably mounted to an outer periphery of a forward end portion of the cutter body, the cutter inserts being arranged in peripherally spaced relation to each other about the rotary axis of the cutter body, wherein each of the cutter inserts has opposite axial end faces, one of the opposite axial end faces being generally in the form of an octagon having eight ridgelines or in the form of a hexagon having six ridges which are formed respectively into cutting edges, each pair of adjacent cutting edges intersecting at an obtuse angle.

BRIEF DESCRIPTION OF THE DRAWINGS

FIG. 2 is a side elevational view of a face milling cutter with cutter inserts according to a first embodiment of the invention;

FIG. 3 a top plan view of the face milling cutter illustrated in FIG. 2;

FIG. 4 is a fragmentary view as viewed from the arrow IV in FIG. 2;

FIG. 5 is a fragmentary view as viewed from the arrow V in FIG. 4;

FIG. 11 is a side elevational view of a face milling cutter with cutter inserts according to a second embodiment of the invention;

FIG. 12 is a top plan view of the face milling cutter illustrated in FIG. 11;

FIG. 13 is a fragmentary view as viewed from the arrow XIII in FIG. 11;

FIG. 16 is a plan view of a cutter insert illustrated in FIG. 15;

FIG. 17 is an enlarged fragmentary view of a corner between each pair of adjacent cutting edges of the cutter insert illustrated in FIG. 16;

FIG. 18 is a view similar to FIG. 17, but showing a modified corner of the cutter insert;

FIG. 19 is a view as viewed from the arrow XIX in FIG. 16;

FIG. 20 is an enlarged fragmentary cross-sectional view taken along the line XX—XX in FIG. 16;

DETAILED DESCRIPTION

Figure 1:
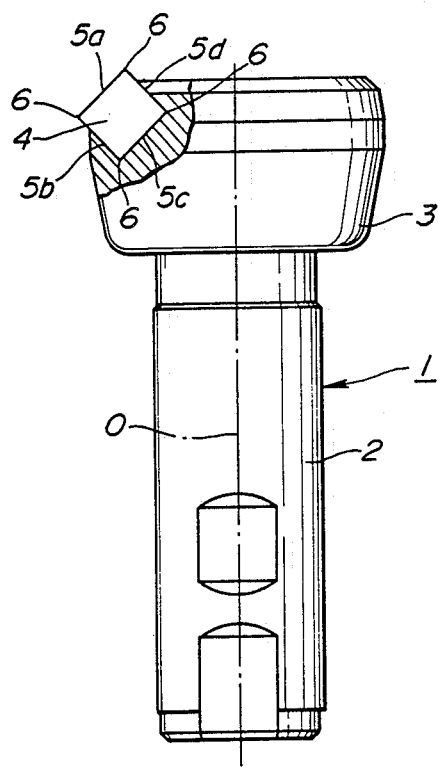
FIG. 1 is a side elevational view of a conventional face milling cutter with cutter inserts.

Referring first to FIGS. 2 through 10, in particular, to FIGS. 2 through 5, there is shown a face milling cutter according to a first embodiment of the invention. The face milling cutter comprises a cutter body 10 which is adapted to be mounted to a main spindle of a milling machine or the like for rotation about a rotary axis O. The cutter body 10 is composed of a columnar shank 12 and a head 13 formed at a forward end portion of the shank 12. The head 13 is in the form of a disc having a relatively large thickness. Three concave chip pockets 14 are formed in an outer periphery of a forward end portion of the head 13 and are arranged in circumferentially equidistantly spaced relation to each other about the rotary axis O. Each of the chip pockets 14 has a wall face directed toward the rotational direction of the cutter body 10. An insert mounting seat 15 in the form of a groove is formed at the wall face of the chip pocket 14. As shown in FIGS. 4 and 5, a seat member 16 is fixedly mounted to the insert mounting seat 15 by means of a set screw 17. A cutter insert 20 in the form of an octagonal plate is fixedly mounted to an upper face of the seat member 16 in a detachable manner by means of a wedge member 25. Specifically, the chip pocket 14 is formed at its bottom with a recess 22 having a wall face 23. The wedge member 25 is arranged between the wall face 23 of the recess 22 and one axial end face or a first face 21a of the cutter insert 20 resting on the seat member 16. The wedge member 25 is wedged into the recess 22 by a clamp screw 24, so that a second face or a seating face 21b of the cutter insert 20 is abutted against the seat member 16. Thus, the cutter insert 20 is fixedly mounted to the insert mounting seat 15 through the seat member 16 in a detachable manner. The first and second faces 21a and 21b of the cutter insert 20 extend parallel to each other.

As clearly shown in FIG. 2, the first face 21a of each cutter insert 20 is generally in the form of a regular octagon and serves as a face. The first face 21a has eight ridgelines which are formed respectively into cutting edges 30a through 30h. A minor cutting edge 31 is formed between each pair of adjacent cutting edges. In a state shown in FIG. 2 in which the cutter insert 20 is mounted to the cutter body 10, a major cutting edge 30ab is formed by the pair of adjacent cutting edges 30a and 30b which intersect at an obtuse angle. The cutter insert 20 is a positive cutter insert in which the first face 21a intersects with eight side faces 21c at an acute angle. The cutter insert 20 is set in such a manner that a corner angle of the cutting edge 30a of the major cutting edge 30ab is brought to an angle of about 45°, and the cutting edge 30b extends substantially parallel to the rotary axis O of the cutter body 10.

The cutting operation by means of the face milling cutter illustrated in FIGS. 2 through 5 will next be described with reference to FIGS. 6 through 10.

Figure 6:
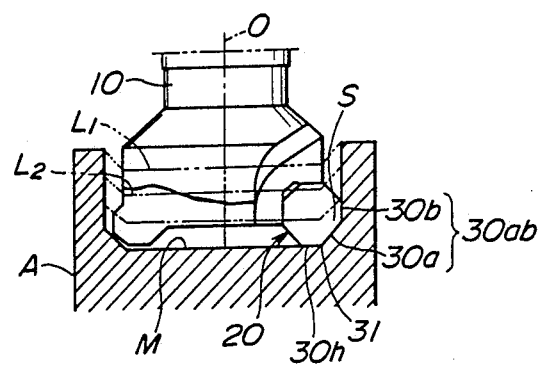
FIG. 6 is a cross-sectional view showing a workpiece in the course of being cut by the face milling cutter illustrated in FIG. 2.

As shown in FIG. 6, the cutter body 10 is rotated about the rotary axis O, and the entire length of the cutting edge 30a of the cutter insert 20 is used to cause the cutting edge 30a to cut a workpiece A to a level $L_1$ indicated by the double dotted line. The cutter body 10 is then moved in a direction perpendicular to the rotary axis O to cut the workpiece A. Since, at this time, the pair of adjacent cutting edges 30a and 30b intersect at an obtuse angle, the mechanical strength of an end S of the cutting edge 30a is high, so that chipping has difficulty occurring at the end S of the cutting edge 30a. Moreover, since the cutter insert 20 is pressed against the insert mounting seat 15 by the cut wall surface of the workpiece A, clamping force acting upon the cutter insert 20 can further be enhanced.

The cutter body 10 is cut further downwardly into the workpiece A by a distance corresponding to the entire length of the cutting edge 30b to a level $L_2$ indicated by the double dotted line. The cutter body 10 is then moved perpendicularly to the rotary axis O, to further cut the workpiece A by the cutting edges 30a and 30b as well as the minor cutting edge 31. At this time, chipping is difficult to occur at the end S of the cutting edge 30a for the reason described previously. Moreover, the cutting edge 30b serves as a so-called flat drag cutting edge, making it possible to smoothly finish a side wall surface of a groove M in the workpiece A.

The process described in the previous paragraph is repeated predetermined times, to form the groove M having a desired depth. At this time, the minor cutting edge 31 serves as a so-called flat drag cutting edge, making it possible to finish a bottom surface of the groove M smoothly.

Figure 7:
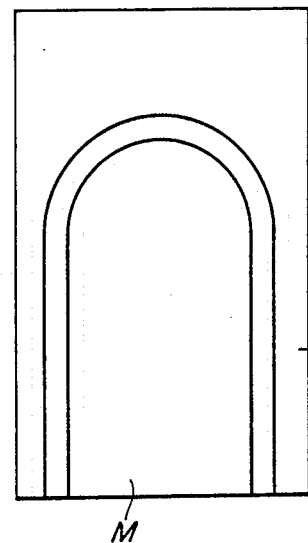
FIG. 7 is a top plan view of the workpiece after having been cut, illustrated in FIG. 6.

In the manner described above, the groove M is formed in the workpiece A as shown in FIG. 7.

In the above face milling cutter, the entire lengths of the respective cutting edges 30a and 30b of the cutter insert 20 participate in cutting. Accordingly, no unused section remains in the cutting edges 30a and 30b. Further, in consideration of the degree of wear on each of the cutting edges 30a through 30h, the cutter insert 20 is detached from the insert mounting seat 15 and then is suitably moved angularly about its axis, thereby selecting appropriate ones of the cutting edges 30a through 30h. Subsequently, the cutter insert 20 is again mounted to the insert mounting seat 15. By doing so, it is made possible to employ these eight cutting edges 30a through 30h uniformly. Thus, there is obtained such a superior advantage that the cutter insert 20 can be used very economically.

Figure 8:
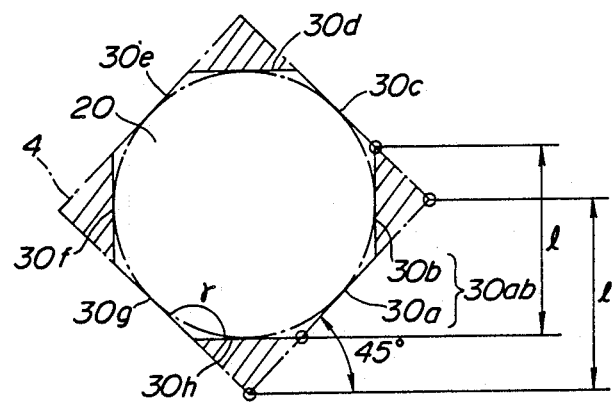
FIG. 8 a top plan view of one of the cutter inserts mounted to a cutter body illustrated in FIG. 2.

In the above face milling cutter, if the cutter insert 20 is formed into such a regular octagon that the cutter insert 20 circumscribes a circle inscribing the conventional square cutter insert 4 as shown in FIG. 8, it is possible to realize an amount of cut 1 equal to that corresponding to one side of the conventional cutter insert 4, by the use of a pair of adjacent sides of the cutter insert 20. In addition, portions shaped in FIG. 8 can be dispensed with. Thus, it is possible to reduce the material cost of the cutter insert 20.

Figure 9:
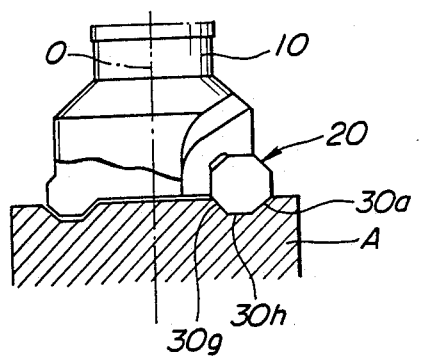
FIG. 9 is a cross-sectional view showing a workpiece in the course of being cut by the face milling cutter illustrated in FIG. 2.
Figure 10:
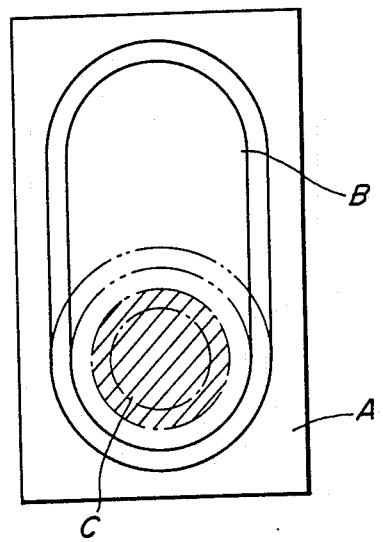
FIG. 10 is a top plan view of the workpiece after having been cut, illustrated in FIG. 9.

Furthermore, as shown in FIG. 9, if the cutting edges 30a, 30g and 30h of the cutter insert 20 are employed to cut the workpiece A, an elongated groove B can be formed in the upper surface of the workpiece A. A projection C shaded in FIG. 10 can also be formed in the groove B. Thus, it is possible to anticipate application of the face milling cutter to processing of various configurations.

As described above, the arrangement of the face milling cutter according to the first embodiment of the invention is such that each of the cutter inserts 20 mounted to the forward end portion of the cutter body 10 has opposite axial end faces 21a and 21b, one of the opposite 21a is generally in the form of an octagon having eight ridgelines which are formed respectively into cutting edges 30a through 30h, and each pair of adjacent cutting edges intersect at an obtuse angle. When cutting is carried out, the entire lengths of the respective cutting edges 30a and 30b which serve as the major cutting edge 30ab are employed to carry out the cutting. Accordingly, no unused section remains in the cutting edges 30a and 30b. Further, in consideration of the degree of wear on each of the cutting edges 30a through 30h, the cutter insert 20 is suitably moved angularly about its axis to select appropriate ones of the cutting edges 30a through 30h, whereby it is made possible to employ these eight cutting edges 30a through 30h uniformly. Thus, there is obtained such a superior advantage that the cutter insert 20 can be used very economically. In this connection, if the cutter insert 20 is in the form of a regular octagon so that each pair of adjacent cutting edges intersect at 135° ($\gamma=135°$), the posture of the cutter insert 20 at the time the cutter insert 20 is moved angularly about its axis and is again mounted to the insert mounting seat 15 can be made constant, making it possible to maintain the axial rake angle and the radial rake angle of the cutter insert 20 constant, and also making it possible to maintain positions of the respective cutting edges 30a through 30h constant.

Furthermore, since each pair of adjacent cutting edges intersect at an obtuse angle, the mechanical strength at the end of each cutting edge is high, making it possible to prevent chipping from occurring at the end of the cutting edge.

Moreover, the cutter insert 20 is in the form of an octagon having eight ridgelines formed respectively into the cutting edges 30a through 30h. Accordingly, if the cutter insert 20 is mounted to the cutter body 10 in consideration of the orientations of the respective cutting edges 30a through 30h, it is possible for the face milling cutter to carry out not only the surface cutting, but also various kinds of processings such as grooving and the like. The invention can also be applied to tools for machining centers and the like.

Figure 14:
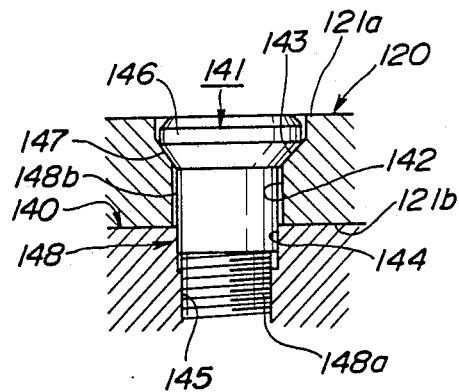
FIG. 14 is an enlarged fragmentary cross-sectional view of the mounting arrangement in which the cutter insert illustrated in FIG. 11 is mounted to a insert mounting seat on a head of a cutter by means of a mounting screw.

Referring next to FIGS. 11 through 14, there is shown a face milling cutter according to a second embodiment of the invention. The second embodiment is similar to the previous described first embodiment in that a head 113 of a cutter body 110 is formed with three circumferentially equidistantly spaced insert mounting seats 140 each in the form of a groove. However, the second embodiment is different from the first embodiment in that cutter inserts 120 are detachably mounted respectively to the insert mounting seats 140 directly by means of respective mounting screws 141. Specifically, as shown in FIG. 14, the cutter insert 120 is formed at its center with a stepped through bore 142 having a step 143 which is so tapered as to diverge gradually toward a first face 121a of the cutter insert 120.

On the other hand, the insert mounting seat 140 is formed therein with a counter bore 144 having a circular cross-section. The counter bore 144 has a bottom face provided therein with a threaded bore 145 in coaxial relation to the counter bore 144.

The mounting screw 141 is composed of a head 146 and a shank 148 extending from a second face of the head 146 in coaxial relation thereto. The shank 148 has a threaded forward end portion section 148a remote from the head 146 and a columnar section 148b extending between the head 146 and the threaded forward end portion section 148a. A face portion 147 of the second face of the head 146, which extends about the columnar section 148b of the shank 148, is tapered correspondingly to the tapered step 143 of the stepped through bore 142 in the cutter insert 120.

The cutter insert 120 is detachably mounted to the insert mounting seat 140 by the mounting screw 141 in the following manner. That is, the threaded forward end portion section 148a of the shank 148 of the mounting screw 141 is threadedly engaged with the threaded bore 145 in the insert mounting seat 140. The columnar section 148b of the shank 148 is fitted in the counter bore 144 in the insert mounting seat 140. The tapered face portion 147 of the second face of the head 146 is abutted against the tapered step 143 of the through bore 142 in the cutter insert 120, so that second face 121b of the cutter insert 120 is abutted against the insert mounting seat 140.

In the face milling cutter illustrated in FIGS. 11 through 14, a load acting upon the cutter insert 120 during cutting is larger than that acting upon the square cutter insert 4 in the conventional face milling cutter. The load is transmitted to the mounting screw 141 through the tapered face portion 147 thereof, to tend to bend the threaded end section 148a. However, the columnar section 148b of the mounting screw 141 is fitted in the counter bore 144 formed in the insert mounting seat 140, to thereby prevent the threaded end section 148a of the cutter insert mounting screw 141 from being bent. Thus, even if a large load acts upon the cutter insert 120, the cutting operation can be carried out without any trouble, and the cutter insert 120 can be mounted to and demounted from the insert mounting seat 140 without any trouble.

It is needless to say that the second embodiment illustrated in FIGS. 11 through 14 can obtain advantages similar to those described previously with reference to the firs embodiment shown in FIGS. 2 through 10.

FIGS. 15 through 20 show a modification of the mounting arrangement described above with reference to FIGS. 11 through 14. In these figures, components and parts like or similar to those shown in FIGS. 11 through 14 are omitted from illustration in order to avoid repetition. In the modification, a cutter insert 220 is mounted to a insert mounting seat 240 by means of a mounting screw 241.

As clearly shown in FIGS. 16, 17 and 19, the cutter insert 220 is in the form of a regular octagon as viewed in plan, and has a first face 221a serving as a face and a second face 221b serving as a seating face. The first and second faces 221a and 221b extend parallel to each other. The cutter insert 220 has eight side faces 221c which are intersected with the first face 221a at an acute angle. The first face 221a has eight ridgelines formed respectively into cutting edges 230a through 230h. Each pair of adjacent cutting edges are connected to each other through a rounded corner 231 serving as a minor cutting edge as clearly shown in FIG. 17. In this connection, it is to be understood that each pair of adjacent cutting edges may be connected to each other through a chamfered corner 231a serving as a minor cutting edge as shown in FIG. 18.

As shown in FIG. 20, the cutter insert 220 is formed at its center with a stepped through bore 242 having a step 243 which is so tapered as to gradually diverge toward the first face 221a of the cutter insert 220. A bore section 242a of the through bore 242 extending between an upper edge of the tapered step 243 to the first face 221a of the cutter insert 220 has a cylindrical wall surface so that the bore section 242a is constant in diameter along an axis of the through bore 242. A circular recess 251 is formed in the second face 221b of the cutter insert 220 in concentric relation to the axis of the through bore 242. The circular recess 251 is larger in diameter than the through bore 242. In this connection, it is to be understood that the recess 251 may have an elliptic cross-sectional shape or a polygonal cross-sectional shape.

Figure 15:
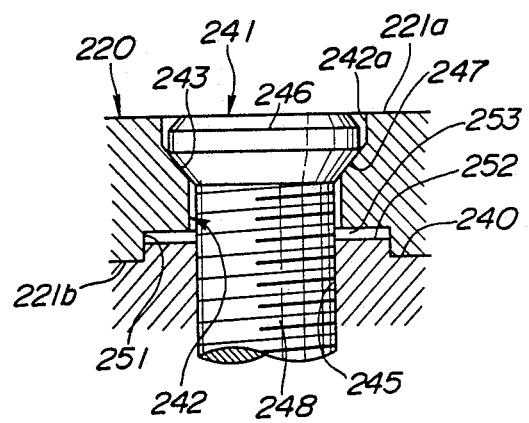
FIG. 15 is a view similar to FIG. 14, but showing a modification of the mounting arrangement.

As shown in detail in FIG. 15, the above-described cutter insert 220 is mounted to the insert mounting seat 240 formed in an outer periphery of a head of a cutter body by means of the mounting screw 241 in a manner similar to that described previously with reference to the second embodiment shown in FIGS. 11 through 14. In the modification shown in FIGS. 15 through 20, however, the insert mounting seat 240 is formed with a projection 252 which can be fitted in the recess 251 in the cutter insert 220 as shown in FIG. 15. The projection 252 has a cross-sectional shape complementary to the recess 251.

The mounting screw 241 is composed of a head 246 and a threaded shank 248 extending from an axial end face of the head 246 in coaxial relation thereto. A face section 247 of an axial end face of the head 246, which extends about the threaded shank 248, is tapered correspondingly to the tapered step 243 of the through bore 242 in the cutter insert 220.

The cutter insert 220 is detachably mounted to the insert mounting seat 240 by the mounting screw 241 in the following manner. That is, the threaded shank 248 of the mounting screw 241 is threadedly engaged with the threaded bore 245 in the insert mounting seat 240. The projection 252 on the insert mounting seat 240 is fitted in the recess 251 in the second face 221b of the cutter insert 220. The tapered face portion 247 of the second face of the head 246 of the mounting screw 241 is abutted against the tapered step 243 of the through bore 242 in the cutter insert 220, so that the second face 221b of the cutter insert 220 is abutted against the insert mounting seat 240. In this mounted state, a slight gap 253 is left between the end face of the projection 252 and the bottom face of the recess 251, thereby ensuring that the second face 221b of the cutter insert 220 is in surface contact with the insert mounting seat 240.

In the modification shown in FIGS. 15 through 20, the projection 252 is formed on the insert mounting seat 240, while the recess 251 is formed in the second face 221b of the cutter insert 220. It is to be understood, however, that the projection 252 may be formed on the second face 221b of the cutter insert 220. In this case, the recess 251 is formed in the insert mounting seat 240.

As described above, the arrangement of the modification shown in FIGS. 15 through 20 is such that the recess 251 is formed on one of the second face 221b of the cutter insert 220 and the insert mounting seat 240, while the projection 252 capable of being fitted in the recess 251 is formed in the other of the second face 221b of the cutter insert 220 and the insert mounting seat 240. With such arrangement, the projection 252 and the recess 251 effectively prevent the cutter insert 220 from being displaced relative to the insert mounting seat 240. Thus, even if the cutting operation is carried out at a high rotational speed and at a high feed speed, it is ensured that the cutter insert 220 is not displaced relatively to the insert mounting seat 240, making it possible to carry out the cutting operation with a superior processing accuracy. Moreover, each pair of adjacent cutting edges are intersected with each other at the obtuse angle, and the rounded or chamfered corner 231 or 231a is formed between each pair of adjacent cutting edges, so that chipping is difficult to occur at the end of each cutting edge. Accordingly, even if the conditions such as the cutting machine, the workpiece and the like, under which the face milling cutter is used, are the same as those under which the conventional face milling cutter is employed, the entire length of each of selected ones of the cutting edges 230a through 230h can be used to carry out the cutting operation without any trouble.

Of course the modification shown in FIGS. 15 through 20 can obtain functional advantages that are the same as or similar to those of the second embodiment shown in FIGS. 11 through 14.

Figure 21:
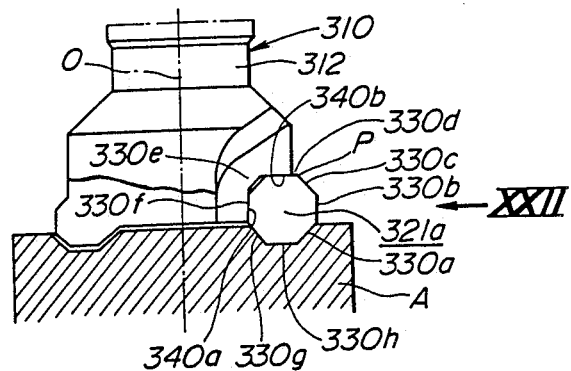
FIG. 21 is a view similar to FIG. 6, but showing face milling cutter according to a third embodiment of the invention.
Figure 22:
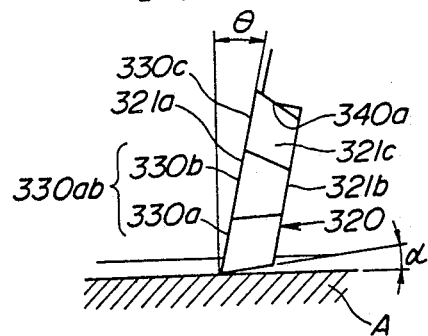
FIG. 22 is an enlarged view as viewed from the arrow XXII in FIG. 21.
Figure 23:
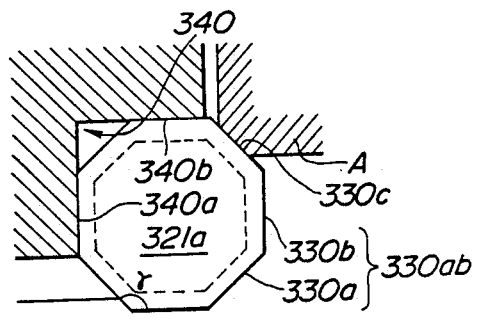
FIG. 23 is an enlarged fragmentary cross-sectional view of the face milling cutter illustrated in FIG. 21, showing the cutter insert which is cutting a back side of a workpiece.

FIGS. 21 through 23 show a face milling cutter according to a third embodiment of the invention. In these figures, components and parts similar to those of the first embodiment illustrated in FIGS. 2 through 10 are omitted from illustration in order to avoid repetition. In the third embodiment, a cutter insert 320 has octagonal one axial end face or a first face 321a having eight ridgelines which are formed respectively into cutting edges 330a through 330h. The cutter insert 320 is a positive cutter insert in which the first face 321a is intersected with eight side faces 321c thereof at an acute angle. The side face 321c associated with the cutting edge 330g is formed into a flank having a positive clearance angle in order to enable the face milling cutter to carry out such a cutting operation as to cut a recess in the workpiece A, like an end mill. The cutter insert 320 is mounted to a head 313 of a cutter body 310 in such a manner that the cutting edge 330a has a corner angle of about 45°, and that the side face 321c associated with the radially inward cutting edge 330f and the side face associated with the cutting edge 330d on the side of the rearward proximal end of a shank 312 of the cutter body 310 are abutted respectively against a pair of wall faces 340a and 340b of a insert mounting seat 340, which intersect at about 90°.

The cutter insert 320 illustrated in FIGS. 21 through 23 is in the form of a regular octagon so that each pair of adjacent cutting edges are intersected with each other at 135°. In the mounted state, the radially outward cutting edge 330b is arranged at an angle within a range of from $-5°$ to $+5°$ with respect to a plane including the rotary axis O of the cutter body 310. The side face 321c associated with the cutting edge 330d on the side of the rearward proximal end of the cutter body 310 is abutted against the wall face 340b of the insert mounting seat 340. At least a portion of the cutter insert 320 extending from a radially outward end P of the cutting edge 320d to the radially outward cutting edge 330b, projects radially outwardly from the wall face 340b of the insert mounting seat 340. By doing so, chips can be prevented from being caught on the outer peripheral edge of the insert mounting seat 340. Further, a large discharge space for the chips produced during the recess forming operation can be secured, making it possible to discharge the chips smoothly toward the rearward end of the cutter body 310. In this connection, the radially outward end of the wall face 340b of the insert mounting seat 340 may be coincident in position with the radially outward end P of the cutting edge 330d.

The cutter insert illustrated in FIGS. 21 through 23 is a positive cutter insert in which the first face 321a of the cutter insert 320 intersects the eight side faces 321c thereof at an acute angle. The cutter insert 320 has a major cutting edge 330ab including the pair of adjacent cutting edges 330a and 330b. The major cutting edge 330ab has an axial rake angle $\theta$ within a range of from 0° to 25° and a clearance angle $\alpha$ within a range of from 5° to 30°, as shown in FIG. 22. With such cutter insert 320, the cutting quality of the major cutting edge 330ab can be enhanced, making it possible to reduce the cutting resistance. In this case, since the clearance angle of the cutting edge 330c is also brought to a positive value, it is possible for the cutter insert 320 to carry out chamfering of the back side of the workpiece A as shown in FIG. 23.

Figure 24:
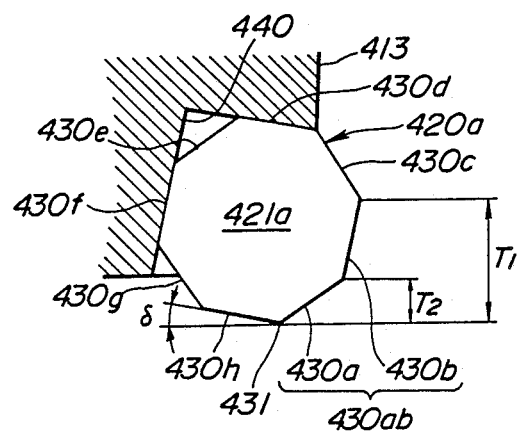
FIG. 24 is an enlarged fragmentary view of a face milling cutter according to a fourth embodiment of the invention, showing one of a plurality of cutter inserts mounted to a cutter body.
Figure 25:
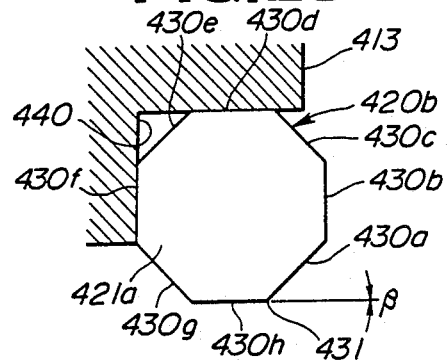
FIG. 25 is a view similar to FIG. 24, but showing another one of the cutter inserts mounted to the same cutter body.
Figure 26:
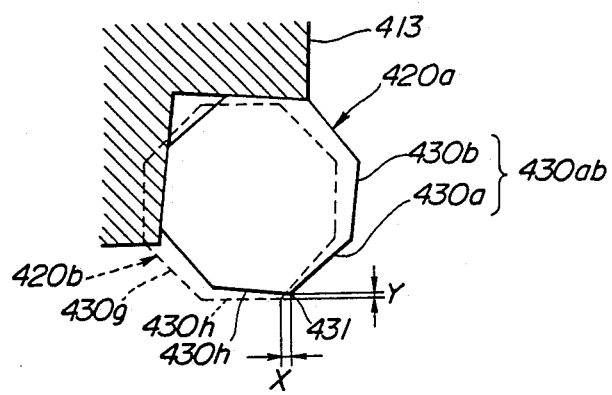
FIG. 26 is a view similar to FIG. 24, but showing the cutter insert illustrated in FIG. 25, which is indicated by the broken line, in an overlapped manner with respect to the cutter insert illustrated in FIG. 24.

FIGS. 24 through 26 show a face milling cutter according to a fourth embodiment of the invention. In these figures, components and parts like or similar to those of the previous embodiments are omitted from illustration. Like the previous embodiments, a plurality of cutter inserts 420a, 420b are mounted to an outer periphery of a head 413 of a cutter body in circumferentially equidistantly spaced relation to each other. Each cutter insert 420a, 420b is a positive cutter insert and has a regular octagonal shape in appearance. One axial end face or a first face 421b of the cutter insert 420a, 420b is formed into a face and has eight ridgelines which are formed respectively into cutting edges 430a through 430h. A minor cutting edge 431 is formed by a chamfered corner between each pair of adjacent cutting edges. The cutter insert 420a, 420b has a major cutting edge 430ab including the pair of adjacent cutting edges 430a and 430b. The cutter insert 420a, 420b is mounted to the head 413 in such a manner that a predetermined clearance angle is given not only to each of flanks associated respectively with the cutting edges 430a and 430b of the major cutting edge 430ab, but also to each of flanks associated respectively with the remaining cutting edges 430c through 430h.

Of the plurality of cutter inserts, a first cutter insert 430a is mounted to the head 413 in such a manner that the forwardly facing cutting edge 430h is so inclined that a radially outward end of the forwardly facing cutting edge 430h is located more remote than a radially inward end thereof from the rearward proximal end of the cutter body, thereby having a minor cutting edge angle $\delta$ within a range of from 1° to 10°, as shown in FIG. 24. In addition, each of the remaining cutter inserts (hereinafter referred to as "flat drag cutter insert") 420b is mounted to the outer periphery of the head 413 at a position closer to the rotary axis of the cutter body than the first cutter insert 420a in such a manner that the forwardly facing cutting edge (hereinafter referred to as "flat drag cutting edge") 430h of the flat drag cutter insert 420b has a minor cutting edge angle $\beta$ within a range of from $-1°$ to $+1°$, as shown in FIG. 25.

Furthermore, the position of the minor cutting edge 431 of the flat drag cutter insert 420b along the rotary axis of the cutter body is the same as that of the minor cutting edge 431 of the first cutter insert 420a, or is located further forward than the minor cutting edge 431 of the first cutter insert 420a, as shown in FIG. 26. In other words, the minor cutting edge 431 of the flat drag cutter insert 420b projects from the minor cutting edge 431 of the first cutter insert 420a. An amount of the projection Y in this case is equal to or less than 0.1 mm, preferably 0.06 mm. The radial position of the minor cutting edge 431 of the flat drag cutter insert 420b is the same as that of the minor cutting edge 431 of the first cutter insert 420a, or is displaced radially inwardly by a predetermined distance X from the minor cutting edge 431 of the first cutter insert 420a.

In the cutting operation by the use of the face milling cutter illustrated in FIGS. 24 through 26, there are cases where substantially the entire length of the major cutting edge 430ab of the first cutter insert 420a is utilized to cut a workpiece to a maximum depth $T_1$ and a case where only the cutting edge 430a is employed to cut the workpiece to a maximum depth $T_2$. In the former case, the first cutter insert 420a is moved angularly about its axis in consideration of wear on the major cutting edge 430ab, and is again mounted to the insert mounting seat 440, whereby the single cutter insert can be used four times. In the latter case, since wear occurs only on the cutting edge 430a and the minor cutting edge 431, the cutter insert can be used eight times. In this manner, the face milling cutter shown in FIGS. 24 through 26 can be utilized very economically, like the previous embodiments.

Moreover, in the face milling cutter shown in FIGS. 24 through 26, portions of the workpiece which are left uncut by the first cutter insert 420a are cut by substantially the entire length of the cutting edge 430h of the flat drag cutter insert 420b. Accordingly, the surface of the workpiece can be cut into an extremely flat face, making it possible to enhance a finished surface accuracy or precision. Chipping is difficult to occur also at the cutting edge 430h of the flat drag cutter insert 420b for the same reason as that described previously.

As described above, in the arrangement of the fourth embodiment shown in FIGS. 24 through 26, the first cutter insert 420a is mounted to the outer periphery of the head 413 of the cutter body in such a manner that the forwardly facing cutting edge 430h is so inclined that the radially outward end of the forwardly facing cutting edge 430h is located remoter than the radially inward end thereof from the rearward proximal end of the cutter body, thereby having the minor cutting edge angle within the range of from 1° to 10°. Further, each of the remaining cutter inserts 420b is mounted to the outer periphery of the head in such a manner as to have the minor cutting edge angle within the range of from $-1°$ to $+1°$. With such arrangement, each cutting edge is shortened in length as compared with the size of the cutter insert, so that even if the entire length of the cutting edge is used to carry out the cutting operation, a load acting upon the cutter insert due to the cutting resistance can be reduced to a value substantially the same as that of a load acting on the conventional cutter insert when a part of the entire length of the cutting edge of the conventional cutter insert is employed to carry out the cutting operation. Moreover, the accuracy of the finished surface can considerably be enhanced.

It is needless to say that the fourth embodiment shown in FIGS. 24 through 26 can obtain the same functional advantages as the previous embodiments.

Figure 27:
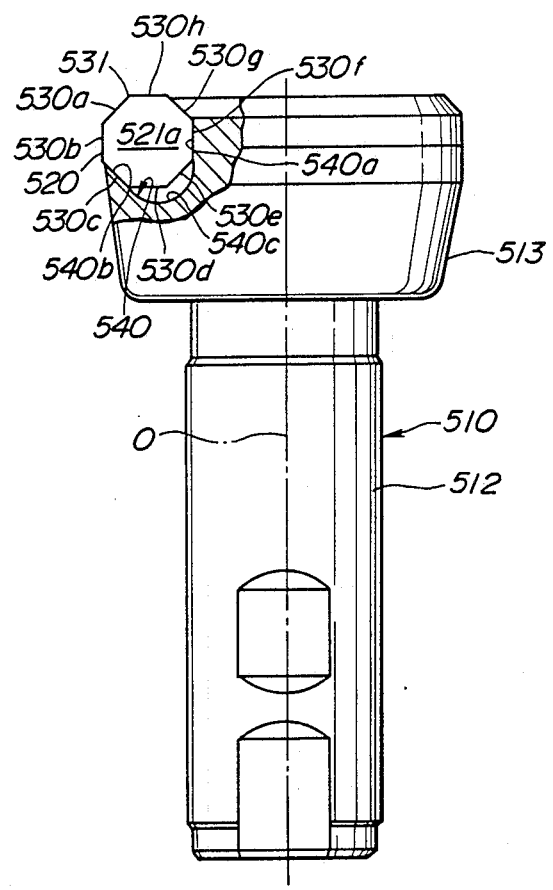
FIG. 27 is a view similar to FIG. 2, but showing a face milling cutter according to a fifth embodiment of the invention.

FIG. 27 shows a face milling cutter according to a fifth embodiment of the invention. In the figure, components and parts similar to those of the previous embodiment are omitted from illustration.

As shown in FIG. 27, a insert mounting seat 540 has a pair of wall faces 540a and 540b. The wall face 540a extends substantially parallel to a rotary axis O of a cutter body 510. On the other hand, the wall face 540b is so inclined as to diverge as the distance increases from a rearward proximal end of a shank 512 of the cutter body 510. The wall faces 540a and 540b have their respective extension lines which intersect at an acute angle. The wall faces 540a and 540b are connected to each other by a concavely curved face 540c having an arcuate shape in appearance. A cutter insert 520 is detachably mounted to the insert mounting seat 540 in the same manner as that described previously with reference to FIGS. 2 through 10.

The cutter insert 520 shown in FIG. 27 is a positive cutter insert in which one axial end face or a first face 521a of the cutter insert 520 intersects eight side faces thereof at an acute angle. The cutter insert 520 is mounted to the insert mounting seat 540 in the following manner. That is, a pair of adjacent cutting edges 530a and 530b that intersect at an obtuse angle serve respectively as first and second major cutting edges. The first major cutting edge 530a is connected to one end of the second major cutting edge 540b remote from the rearward proximal end of the shank 512 of the cutter body 510. When it is supposed that the remaining cutting edges 530c through 530h are called respectively third to eighth cutting edges in order from the cutting edge 530c connected to the other end of the second major cutting edge 530b, the side face associated with the seventh cutting edge 530g is formed into a flank having a positive clearance angle, and the side faces associated respectively with the third and sixth cutting edges 530c and 530f are abutted respectively against the pair of wall faces 540a and 540b of the insert mounting seat 540.

It is possible for the face milling cutter shown in FIG. 27 to cut a workpiece also by the seventh or radially inward cutting edge 530g. Cutting resistance acting upon the radially inward cutting edge 530g can be born by the wall face 540b of the insert mounting seat 540. Thus, the radially inward cutting edge 530g can be utilized in the same manner as the first and second major cutting edges 530a and 530b. Accordingly, such a cutting operation as to cut a recess in a workpiece, which conventionally could not but rely upon an end mill, can be carried out without any trouble. Moreover, since the wall faces 540a and 540b of the insert mounting seat 540 have their respective extension lines intersected with each other at an acute angle, the cutting resistance acting upon the cutter insert 520 causes the same to be wedged strongly into the recess defined between the wall faces 540a and 540b, making it possible to further enhance the clamping strength with respect to the cutter insert 520.

Furthermore, since the cutting edge 530b of the cutter insert 520 shown in FIG. 27 is made substantially parallel to a plane including the rotary axis O of the shank 512 of the cutter body 510, the second major cutting edge 530b serves as a flat drag cutting edge, so that the side wall surface of a groove cut by the face milling cutter can be finished more smoothly.

Figure 28:
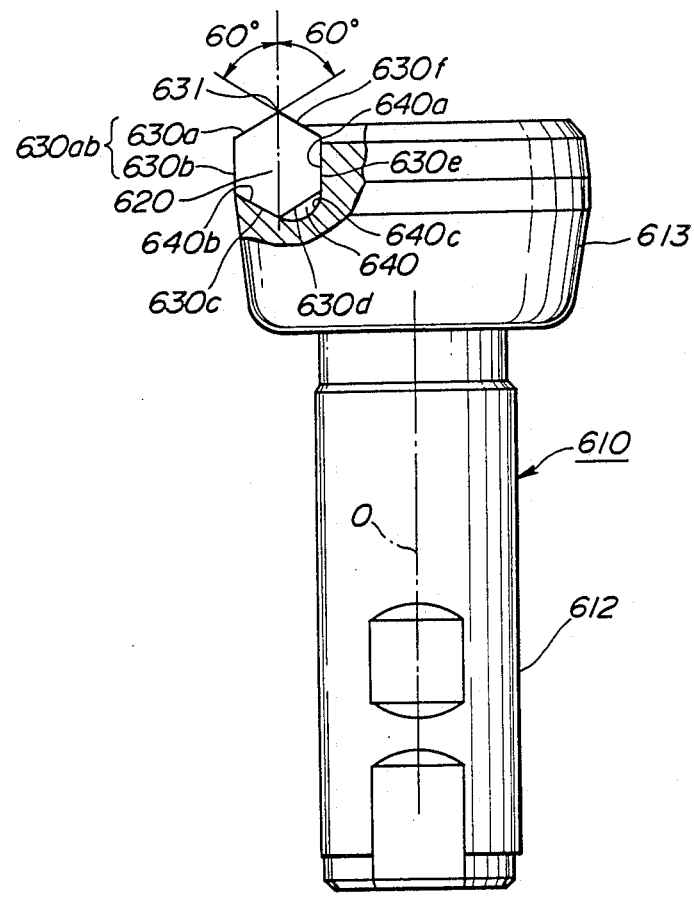
FIG. 28 is a view similar to FIG. 27, but showing a face milling cutter according to a sixth embodiment of the invention.
Figure 29:
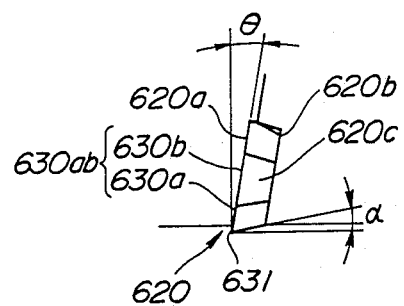
FIG. 29 is a side elevational view of a cutter insert in the face milling cutter illustrated in FIG. 28.
Figure 30:
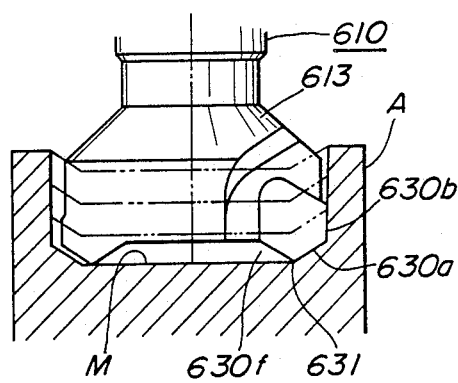
FIG. 30 is a cross-sectional view showing a workpiece in the course of being cut by the face milling cutter illustrated in FIG. 28.

FIG. 28 through 30 show a face milling cutter according to a sixth embodiment of the invention. In the sixth embodiment, a cutter insert 620 has regular hexagonal one axial end face or a first face 621a having six ridgelines which are formed respectively into cutting edges 630a through 630f. A minor cutting edge 631 is formed between the cutting edge 630a and 630f which is adjacent to the cutting edge 630a. The cutter insert 620 is a positive cutter insert in which the first face 621a is intersected with six side faces 621c thereof at an acute angle. The cutter insert 620 has a major cutting edge 630ab including the pair of adjacent cutting edges 630a and 630b. The major cutting edge 630ab has an axial rake angle $\theta$ about 10° and a clearance angle $\alpha$ about 10°, as shown in FIG. 29.

As shown in FIG. 28, a cutter insert mounting seat 640 has a pair of wall faces 640a and 640b. The wall face 640a extends substantially parallel to a rotary axis O of a cutter body 610. The wall faces 640b is so inclined as to diverge as the distance increases from a rearward proximal end of a shank 612 of the cutter body 610. The wall faces 640a and 640b have their respective extension lines which intersect at an acute angle. The wall faces 640a and 640b are connected to each other by a concavely curved face 640c having an acute shape in appearance. The cutter insert 620 is detachably mounted to the cutter insert mounting seat 640 in the same manner as that described previously with reference to FIG. 2 through 10. And the cutting insert 620 is set in such a manner that a corner angle of the cutting edge 630a of the major cutting edge 630ab is brought to an angle of about 60°, and the cutting edge 630b extends substantially parallel to the rotary axis O of the cutter body 610. Moreover, since the wall faces 640a and 640b of the cutter insert mounting seat 640 have their respective extension lines intersected with each other at an acute angle, the cutting resistance acting upon the cutter insert 620 causes the same to be wedged strongly into the recess defined between the wall faces 640a and 640b, making it possible to further enhance the clamping strength with respect to the cutter insert 620.

As shown in FIG. 30, a workpiece A is cut by this face milling cutter in the same manner as described above in FIG. 6. In this case, the pair of adjacent cutting edges 630a and 630b intersect at an obtuse angle, the mechanical strength of an end S of the cutting edge 630a is high, so that chipping is difficult to occur at the end S of the cutting edge 630a. Moreover, since the cutter insert 620 is pressed against the cutter insert mounting seat 640 by the cut wall surface of the workpiece A, clamping force acting upon the cutter insert 620 can further be enhanced. In this face milling cutter, the cutting edge 630f is formed into a flank having a positive clearance angle in order to enable the face milling cutter to carry out such a cutting operation as to cut a recess in the workpiece A, like an end mill. And the cutting edge 630b serves as a so-called flat drag cutting edge, making it possible to smoothly finish a side wall surface of a groove M in the workpiece A.

What is claimed is:

1. A face milling cutter comprising:
   a cutter body of a generally circular cross-section having an axis of rotation therethrough; and
   a plurality of indexable cutter inserts releaseably mounted on an outer periphery of a forward end portion of said cutter body in circumferentially space relation to each other, each of said inserts being octagonal in shape and being defined by opposite first and second faces and a peripheral surface disposed therebetween, said first face having eight ridge lines defining eight cutting edges respectively, each of said inserts being positive such that said first face intersects said peripheral surface at an acute angle;

two adjacent cutting edges of said eight cutting edges facing radially outward and serving as major cutting edges while a cutting edge disposed adjacent said major cutting edges faces generally forwardly with respect to said body to serve as an end cutting edge, a cutting edge disposed adjacent to said end cutting edge directed away from said major cutting edges facing radially inward and forward with respect to said body to serve as an inner cutting edge.

2. A face milling cutter as claimed in claim 1, wherein each of said cutting inserts is disposed such that the cutting edge disposed adjacent to said major cutting edges in a rearward position serves as a rearward cutting edge.

3. A face milling cutter according to claim 1,
wherein the outer periphery of the forward end portion of said cutter body is formed with a plurality of insert mounting seats for the respective cutter inserts, each of said insert mounting seats having a pair of wall faces whose respective extension lines are intersecting with each other at an acute angle, and wherein each of said cutter inserts is mounted to the outer periphery of the forward end portion of said cutter body in such a manner that a pair of adjacent ones of the cutting edges of the cutter insert form a first major cutting edge and a second major cutting edge, the first cutting edge being connected to one end of the second major cutting edge remote from a rearward proximal end of said cutter body, and that, a side face being connected to one end of the first major cutting edge remote from a rearward proximal end of said cutter body is formed into a flank having a positive clearance angle.

4. A face milling cutter according to claim 1, wherein the cutting edges of the cutter insert have their respective lengths substantially equal to each other and intersecting each other at a substantially equal angle.

5. A face milling cutter according to claim 1, wherein a first one of said cutter inserts is mounted to the outer periphery of the forward end portion of said cutter body in such a manner that a forwardly facing one of the cutting edges of the first cutter insert is so inclined that a radially outward end of the forwardly facing cutting edge is located remoter than a radially inward end thereof from the proximal end of said cutter body, thereby having a minor cutting edge angle within a range of from 1° to 10°, and wherein each of the remaining cutter inserts is mounted to the outer periphery of the forward end portion of said cutter body in such a manner as to have a minor cutting edge angle within a range of from −1° to +1°.

6. A face milling cutter according to claim 1, wherein the outer periphery of the forward end portion of said cutter body is provided with a plurality of insert mounting seats corresponding in number to said cutter inserts, and wherein the face milling cutter further comprises:

a plurality of seat members fixedly mounted to said respective insert mounting seats, said cutter inserts being seated on said respective seat members; and wedge members associated respectively with said cutter inserts, each of said wedge members being mounted to said cutter body in such a manner that the wedge member acts upon the one axial end face of a corresponding one of said cutter inserts to abut the other axial end face of the cutter insert against a corresponding one of said seat members.

7. A face milling cutter according to claim 1, wherein the outer periphery of the forward end portion of said cutter body is provided with a plurality of insert mounting seats for the respective cutter inserts, each of said insert mounting seats being formed therein with a counter bore which has a bottom formed therein with a threaded bore, wherein each of said cutter inserts is formed at its center with a stepped through bore, wherein the face milling cutter further comprises a plurality of mounting screws associated respectively with said cutter inserts, each of said mounting screws being composed of a head and a shank extending from an axial end face of said head in coaxial relation thereto, said shank having a threaded forward end portion section remote from said head and a columnar section extending between said head and said threaded forward end portion section, and wherein each of said cutter inserts is mounted to a corresponding one of said insert mounting seats by a corresponding one of said mounting screws in such a manner that the threaded forward end portion section of the shank of the mounting screw is threadedly engaged with the threaded bore in the insert mounting seat, that the columnar section of the shank is fitted in the counter bore in the insert mounting seat, and that a face portion of the axial end face of the head of the mounting screw, which extends about the shank of the mounting screw, is abutted against the step of the through bore in the cutter insert, so that the other axial end face of the cutter insert is abutted against the insert mounting seat.

8. A face milling cutter according to claim 7, wherein the step of the through bore in each of said cutter inserts is tapered, while the face portion of the axial end face of the head of a corresponding one of said mounting screws is tapered correspondingly to the tapered step.

9. A face milling cutter according to claim 1, wherein the outer periphery of the forward end portion of said cutter body is formed with a plurality of insert mounting seats for the respective cutter inserts, each of said insert mounting seats being formed therein with a threaded bore, wherein each of said cutter inserts is formed at its center with a through bore, wherein the face milling cutter further comprises a plurality of mounting screws associated respectively with said cutter inserts, each of said mounting screws being composed of a head and a threaded shank extending from an axial end face of said head in coaxial relation thereto, wherein a recess is formed in one of the faces of each of the cutter inserts and a corresponding one of said insert mounting seats, while a projection capable of being fitted in the recess is formed on the other of the end faces of the cutter insert and the insert mounting seat, and wherein each of said cutter inserts is mounted to a corresponding one of said insert mounting seats by a corresponding one of said mounting screws in such a manner that the threaded shank of the mounting screw is threadedly engaged with the threaded bore in the mounting seat to abut the other axial end face of the cutter insert against the insert mounting seat, with the projection fitted in the recess.

10. A face milling cutter according to claim 9, wherein the through bore in each of said cutter inserts is a stepped bore having a tapered step, and wherein a face section of the axial end face of the head of each of said mounting screws, which extends about the threaded shank of a corresponding one of said mounting screws, is tapered correspondingly to the tapered step of the through bore in a corresponding one of said cutter inserts, and is abutted against the tapered step.

11. A face milling cutter according to claim 1, wherein each pair of adjacent cutting edges of each of said cutter inserts are connected to each other through a chamfered corner serving as a minor cutting edge.

12. A face milling cutter according to claim 1, wherein each pair of adjacent cutting edges of each of said cutter inserts are connected to each other through a rounded corner serving as a minor cutting edge.

13. A face milling cutter according to claim 1, wherein the outer periphery of the forward end portion of said cutter body is formed with a plurality of insert mounting seats for the respective cutter inserts, each of said insert mounting seats having at least one wall face, wherein each pair of adjacent cutting edges of each of said cutter inserts are intersected with each other at 135°, and wherein each of said cutter inserts is mounted to the outer periphery of the forward end portion of said cutter body in such a manner that a radially outward one of the cutting edges of the cutter insert is arranged at an angle within a range of from −5° to +5° with respect to a plane including the rotary axis of said cutter body, that the side face associated with one of the cutting edges on the side of a rearward proximal end of said cutter body is abutted against the wall face of a corresponding one of said insert mounting seats, and that at least a portion of the cutter insert extending from a radially outward end of the cutting edge on the side of the proximal end of said cutter body, to the radially outward cutting edge, projects radially outwardly from the wall face of the insert mounting seat.

14. A face milling cutter according to claim 13, wherein each of said cutter inserts has a major cutting edge including selected adjacent ones of the cutting edges of the cutter insert, the major cutting edge having an axial rake angle within a range of from 0° to 25° and a clearance angle within a range of from 5° to 30°.

15. A face milling cutter comprising:
a cutter body of a generally circular cross-section having an axis of rotation therethrough; and
a plurality of indexable cutter inserts releaseably mounted on an outer periphery of a forward end portion of said cutter body in circumferentially spaced relation to each other, each of said inserts being of a hexagonal shape and being defined by opposite first and second faces and a peripheral surface disposed therebetween, said first face having six ridge lines defining six cutting edges, each of said inserts being positive such that said first face intersects said peripheral surface at an acute angle;

two adjacent cutting edges of said six cutting edges face generally radially outward to serve as major cutting edges while a cutting edge disposed adjacent to said major cutting edges faces generally radially inward and forward with respect to said body to serve as an inner cutting edge.

16. A face milling cutter according to claim 15, wherein the outer periphery of the forward end portion of said cutter body is formed with a plurality of insert mounting seats for the respective cutter inserts, each of said insert mounting seats having a pair of wall faces whose respective extension lines are intersecting with each other at an acute angle, and wherein each of said cutter inserts is mounted to the outer periphery of the forward end portion of said cutter body in such a manner that a pair of adjacent ones of the cutting edges of the cutter insert form a first major cutting edge and a second major cutting edge, the first cutting edge being connected to one end of the second major cutting edge remote from a rearward proximal end of said cutter body, and that, a side face being connected to one end of the first major cutting edge remote from a rearward proximal end of said cutter body is formed into a flank having a positive clearance angle.

17. A face milling cutter according to claim 15, wherein each pair of adjacent cutting edges of each of said cutter inserts are connected to each other through a rounded corner serving as a minor cutting edge.

18. A face milling cutter according to claim 15, wherein each pair of adjacent cutting edges of each of said cutter inserts are connected to each other through a chamfered corner serving as a minor cutting edge.

19. A face milling cutter according to claim 15, wherein the cutting edges of the cutter insert have their respective lengths substantially equal to each other and intersecting each other at a substantially equal angle.

20. A face milling cutter according to claim 15, wherein the outer periphery of the forward end portion of said cutter body is provided with a plurality of insert mounting seats corresponding in number to said cutter inserts; and wherein the face milling cutter further comprises:
a plurality of seat members fixedly mounted to said respective insert mounting seats, said cutter inserts being seated on said respective seat members; and
wedge members associated respectively with said cutter inserts, each of said wedge members being mounted to said cutter body in such a manner that the wedge member acts upon the one axial end face of a corresponding one of said cutter inserts to abut the other axial end face of the cutter insert against a corresponding one of said seat members.

21. A face milling cutter according to claim 15, wherein the outer periphery of the forward end portion of said cutter body is provided with a plurality of insert mounting seats for the respective cutter inserts, each of said insert mounting seats being formed therein with a counter bore which has a bottom formed therein with a threaded bore;

wherein each of said cutter inserts is formed at its center with a stepped through bore;

wherein the face milling cutter further comprises a plurality of mounting screws associated respectively with said cutter inserts, each of said mounting screws being composed of a head and a shank extending from an axial end face of said head in coaxial relation thereto, said shank having a threaded forward end portion section remote from said head and a columnar section extending between said head and said threaded forward end portion section; and wherein each of said cutter inserts is mounted to a corresponding one of said insert mounting seats by a corresponding one of said mounting screws in such a manner that the threaded forward end portion section of the shank of the mounting screw is threadedly engaged with the threaded bore in the insert mounting seat, that the columnar section of the shank is fitted in the counter bore in the insert mounting seat, and that a face portion of the axial end face of the head of the mounting screw, which extends about the shank of the mounting screw, is abutted against the step of the through bore in the cutter insert, so that the other axial end face of the cutter insert is abutted against the insert mounting seat.

22. A face milling cutter according to claim 21, wherein the step of the through bore in each of said cutter inserts is tapered, while the face portion of the axial end face of the head of a corresponding one of said mounting screws is tapered corresponding to the tapered step.

23. A face milling cutter according to claim 15, wherein the outer periphery of the forward end portion of said cutter body is formed with a plurality of insert mounting seats for the respective cutter inserts, each of said insert mounting seats being formed therein with a threaded bore;

wherein each of said cutter inserts is formed at its center with a through bore;

wherein the face milling cutter further comprises a plurality of mounting screws associated respectively with said cutter inserts, each of said mounting screws being composed of a head and a threaded shank extending from an axial end face of said head in coaxial relation thereto;

wherein a recess is formed in one of the faces of each of the cutter inserts and a corresponding one of said insert mounting seats, while a projection capable of being fitted in the recess is formed on the other of the end faces of the cutter insert and the insert mounting seat; and wherein each of said cutter inserts is mounted to a corresponding one of said insert mounting seats by a corresponding one of said mounting screws in such a manner that the threaded shank of the mounting screw is threadedly engaged with the threaded bore in the mounting seat to abut the other axial end face of the cutter insert against the insert mounting seat, with the projection fitted in the recess.

24. A face milling cutter according to claim 23, wherein the through bore in each of said cutter inserts is a stepped bore having a tapered step, and wherein a face section of the axial end face of the head of each of said mounting screws, which extends about the threaded shank of a corresponding one of said mounting screws, is tapered correspondingly to the tapered step of the through bore in a corresponding one of said cutter inserts, and is abutted against the tapered step.

* * * * *